May 19, 1970     S. G. DRAPER     3,512,617

STOPPING MEANS FOR ROTARY MEMBERS

Filed Aug. 21, 1968

INVENTOR
STANLEY GEORGE DRAPER
By Linton and Linton
ATTORNEYS

United States Patent Office 3,512,617
Patented May 19, 1970

3,512,617
STOPPING MEANS FOR ROTARY MEMBERS
Stanley George Draper, 15 Forest Rise,
Thurnby, Leicester, England
Filed Aug. 21, 1968, Ser. No. 754,189
Claims priority, application Great Britain, Aug. 23, 1967,
38,721/67
Int. Cl. B60t 7/12
U.S. Cl. 188—110
4 Claims

ABSTRACT OF THE DISCLOSURE

The present means is for stopping a rotary member such as a machine shaft, at a predetermined point in the rotary path of the member and includes a rotary part for being coupled to the member, braking means for co-operating with the rotary part, a power operated device for actuating the braking means, and means on the rotary part at a predetermined position circumferentially thereof for initiating operation of the power operated device to actuate the braking means.

Figure 1:
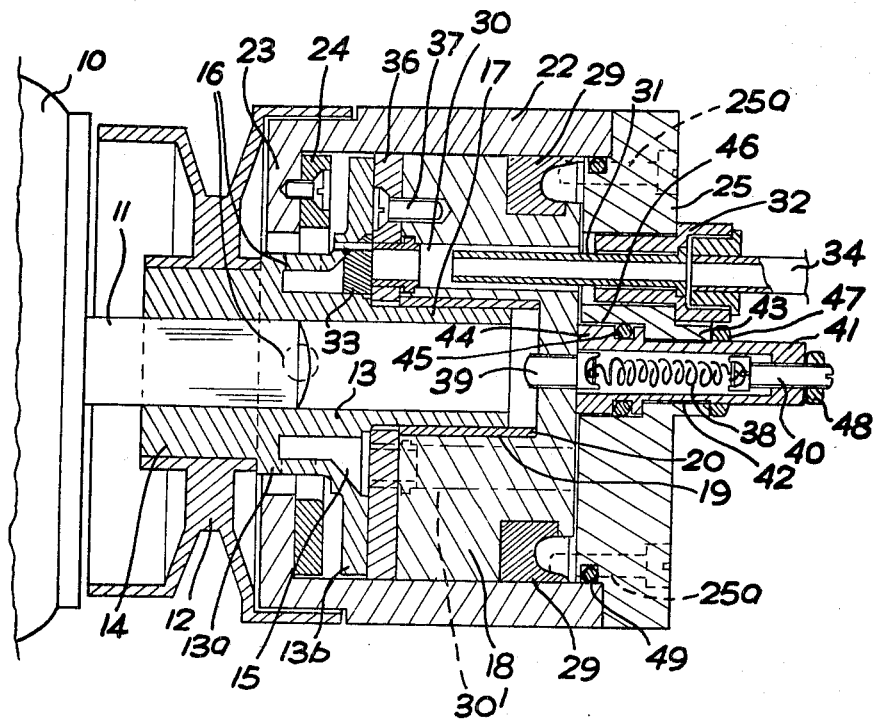

This invention is for improvements in stopping means for rotary members and is concerned more particularly with a stopping means which will operate to arrest a rotary member such as a shaft in a predetermined setting. The invention has for an object to provide stopping means of a particularly effective and convenient form which will operate in this way. A further object is to provide means of the character indicated which can be readily fitted to an existing equipment or apparatus.

The invention may be employed conveniently in connection with sewing machines to arrest an operating spindle in a predetermined setting such that the machine when stopped comes to rest with its needle (or needles) in a desired position, for example up out of engagement with the work or down in a position penetrating the work. However it is to be understood that the invention can be applied to any apparatus or machine in which a rotary member is required to be brought to rest in a predetermined setting.

In accordance with the invention there is provided stopping means for a rotary member comprising a part which is arranged to rotate with said member, braking means for arresting rotation of the member, a power operated device for actuating said braking means and means provided on said rotary part at a predetermined position circumferentially thereof for causing said power operated device to actuate the braking means. There may be provided to co-operate with said rotary part a stationary sensing member which at an appropriate position has means for sensing the proximity of the said means on the rotary part and causing the power operated device to operate and supply the brake immediately the rotary part has turned to the appropriate position.

The power operated device will during normal running remain inactive and will only be energised when the stopping means is operated to arrest the rotary part. Thereupon a particularly effective location of the position of stoppage is obtained by means of the parts provided by the invention which can be of relatively simple construction and contained in a small compass.

Although it may take other forms (for example, an electrical solenoid device) the power operated device is conveniently one operated by fluid pressure.

In a convenient form of construction the stationary sensing member aforementioned has a passageway extending up to the said rotary part in the general direction of the axis of rotation and a fluid pressure supply tube extends into the passage up to the end adjacent to the rotary part leaving a space around it. The rotary part has an annular recess at a radius corresponding to the position of said passageway from which an escape passage or passages permits the pressure fluid to escape freely from the apparatus. The annular recess is fitted with a blocking member at a position corresponding to the desired point in the rotation of the rotary part at which stoppage is required to occur so that when the said rotary part turns to the position at which the blocking member closes the passageway in the sensing member the pressure fluid is no longer allowed to escape but flows back around the tube through which it is injected and exerts pressure on a movable part to apply the brake firmly and quickly to bring the rotary part promptly to rest and thereby arrest movement of the rotary member to which the rotary part is connected.

Obviously by providing the sensing member with a plurality of sensing means spaced apart around the axis of rotation of the rotary part (for example passageways each provided with a fluid pressure supply tube) and arranging matters so that a selected one of the sensing means is effective in causing the brake to be applied, arrestment of the rotary member can be made to occur in different predetermined positions thereof.

In a particularly useful form of a fluid pressure operated construction the sensing member is contained within a cylinder which also embraces a flange in the rotary part and is fitted internally with a brake shoe to co-operate with such flange. When a stoppage is required the fluid pressure flowing back around the inlet tube impinges on a closure member of the cylinder fitted with the brake shoe urging it promptly in the direction to apply the brake.

Figure 2:
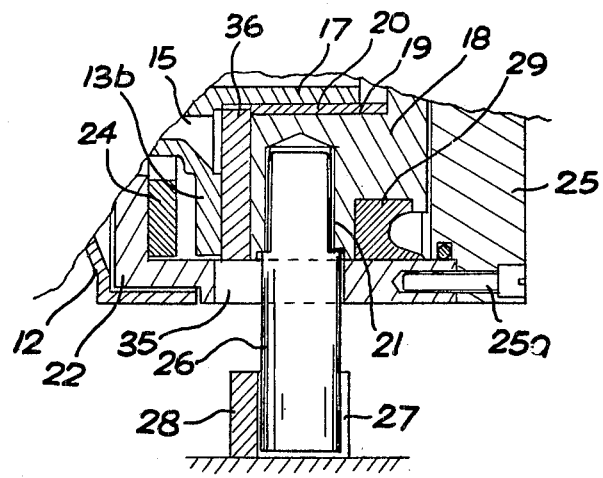

A convenient form of construction operated by fluid pressure is illustrated by way of example in the accompanyings and will now be described with reference to the drawings in which, FIG. 1 is a plan view in central cross-section of an attachment embodying the invention applied to the operating shaft of a sewing machine, and FIG. 2 is an elevation view in central cross-section of a portion of the lower part of the same attachment.

In FIG. 1 of the drawings the sewing machine is shown at 10 and its operating spindle at 11. To the spindle 11 there is secured a driving pulley 12 and a rotary part 13 having a stem part 14 which fits on the spindle 11 within the pulley 12 and is secured thereto by the same fixing, for example a coupling pin or screw (not shown). The rotary part has a stepped body part 13a in which there is formed an annular recess 15 which opens onto the right-hand face of the body part inwardly of a flange 13b and which communicates with spaced radial escape passages 16. Extending centrally from the right of the rotary part is a spindle portion 17. This has bearing engagement in a central bore 19 in a stationary sensing member 18 preferably through a bearing liner 20.

The sensing member 18 is in the form of a piston and has mounted around it a cylinder 22 slidable on member 18 and formed at its left-hand end as seen in FIG. 1 with an inturned flange 23 fitted internally with a brake shoe in the form of a flat ring 24. The cylinder 22 forms a stationary braking member and it embraces the sensing member 18 being closed at its right-hand end by a sealing cap 25, held in place by bolts 25a. There is an anchoring stud 26 (FIG. 2) which is screwed into a recess 21 in the bottom of the sensing member 18 and passes through a slot 35 in the cylinder 22 into a slot 27 in a fixed anchorage block 28, to prevent rotation of the sensing member 18 and cylinder 22. The slot in the cylinder 22 through which the block 26 passes is of such form that the cylinder 22 is permitted to move endwise to apply and release the brake shoe 24 which when engaged presses against the flange 13b of the rotary part 13, and grips such flange between it and the sensing member 18 on which there is a brake lining disc 36 fixed by screws 37.

The sensing member 18 is fitted with a sealing ring 29 in sliding engagement with the interior of the cylinder 22. Thus, the space between the right-hand end of the sensing member 18 and the cap 25 is sealed against escape of fluid under pressure. There is a passageway 30 formed in the sensing member and opening at its left-hand end onto the recess 15 in the rotary part 13. Projecting into the passageway 30 is a fluid pressure supply tube 31 which enters through a gland 32 in the cap 25 and extends almost to the left hand end of passageway 30. At a position in the recess 15 corresponding to the position at which the sewing machine spindle 11 is required to come to rest when stopped there is fitted a blocking member 33 in the form of a small shaped block which when the rotary part 13 turns to bring the part 33 in line with the passageway 30 closes the latter thereby arresting flow of fluid pressure (e.g. air pressure) into the recess 15 and causing the flow to pass in reverse outside the tube 31 into the space between the sensing member 18 and the cap 25. This builds up the pressure in such space so as to move the cylinder 22 to the right and apply the brake to the rotary part 13 and spindle 11.

The fluid pressure action to apply the brake operates against the action of a brake releasing spring 38 fitted between anchorage screws 39 and 40 on the member 18 and cover 25 respectively. The screw 40 screws into an internally stepped sleeve 41 which has also an external thread by which it is screwed into an aperture 42 in a central boss 43 of the cover 25. The sleeve 41 has a sealing boss 44 fitted with an O-ring 45 to form a seal against a recess 46 in the cover, permitting adjustment of the sleeve to take up undesired lost motion between the members 18 and 22. Adjustment of the tension in the spring 38 is obtained by adjusting the screw 40. When adjusted the sleeve 41 and screw 40 are fixed by lock nuts 47 and 48. A further O-ring 49 is provided as a seal for the cover 25.

The tube 31 is connected by a flexible pipe 34 to a source of fluid air under pressure through a valve which switches on the fluid pressure to the pipe 31 as soon as the stopping means is operated to stop the machine 10. When the fluid pressure is so applied to the tube 31 it will be permitted to escape through the recess 15 and escape passages 16 and thence out of the apparatus until the blocking member 33 closes the end of the passageway 30. When this occurs the brake is applied instantaneously to bring the spindle 11 promptly to rest.

The parts illustrated are organised to ensure that whenever stoppage occurs the machine comes to rest with the sewing needle(s) in a predetermined position e.g. either raised or lowered. If desired an alternative position for stoppage may be arranged by having a further passageway as in broken lines at 30' in the member 18 equipped also with a fluid pressure supply tube like the tube 31. The further passageway may be positioned for example diametrically opposite the passageway shown in the drawings. In this case a fluid pressure supply valve would be associated with both passageways and operate to select which passageway is to receive the fluid pressure. In addition it would be necessary to provide for one way flow from each passageway into the space between the member 18 and the cover 25 by providing valve means at each passageway which would prevent reverse flow.

In the example illustrated the assembly of parts bearing the reference numbers 12 to 26 inclusive and 29 to 49 inclusive forms a complete and compact unit which can be mounted on the driving spindle of an existing machine in place of the normal driving pulley.

What I claim is:

1. Stopping means for a rotary member comprising in combination a rotary part capable of being coupled to the member, braking means co-operating with said rotary part to arrest its rotation, a fluid pressure power operated device for actuating said braking means, means on said rotary part at a predetermined position circumferentially thereof for initiating operation of said power operated device to actuate said braking means, a sensing member co-operating with said rotary part, a passageway extending through said sensing member up to said rotary part in the general direction of the axis of rotation thereof and a fluid pressure supply tube extending into the passage, and having an annular recess provided in said rotary member, registering with the opening of said passage, and a blocking member fitted to said annular recess to close the end of the passage at a position corresponding to the desired point in the rotation of said rotary part at which stoppage is required to occur.

2. Stopping means according to claim 1 wherein the sensing member forms a piston of a fluid pressure operated device, the cylinder of which carries braking means to act on the rotary device.

3. Stopping means according to claim 2 wherein the cylinder of the fluid pressure operated device is closed at the end adjacent to that part of the sensing member which is remote from the rotary member and at its opposite end has an inturned flange, and having a brake pad carried by said inturned flange to engage with a flange on the rotary part.

4. Stopping means according to claim 3 wherein the brake pad is arranged when operated to grip the flange of the rotary part between it and a part on the sensing member.

References Cited

UNITED STATES PATENTS

| | | | |
|---|---|---|---|
| 2,056,372 | 10/1936 | Schwartz. | |
| 2,950,086 | 8/1960 | Abraham | 188—110 X |
| 3,026,834 | 3/1962 | Frentzel | 112—219 |
| 3,156,204 | 11/1964 | Harnish et al. | |
| 3,359,931 | 12/1967 | Miller et al. | |

GEORGE E. A. HALVOSA, Primary Examiner

U.S. Cl. X.R.

112—219; 192—139